(12) United States Patent
Chun et al.

(10) Patent No.: US 7,519,037 B2
(45) Date of Patent: Apr. 14, 2009

(54) RADIO RESOURCE ALLOCATION SYSTEM FOR PACKET DATA SERVICE AND ALLOCATION METHOD THEREOF

(75) Inventors: Sun-Sim Chun, Daejeon (KR); Hyeong-Jun Park, Daejeon (KR); Byeong-Ho Yun, Daejeon (KR); Dae-Soon Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 595 days.

(21) Appl. No.: 11/262,382

(22) Filed: Oct. 27, 2005

(65) Prior Publication Data

US 2006/0133403 A1 Jun. 22, 2006

(30) Foreign Application Priority Data

Dec. 17, 2004 (KR) .................. 10-2004-0108243

(51) Int. Cl.
*H04Q 7/24* (2006.01)
*H04J 3/16* (2006.01)
(52) U.S. Cl. ........................ 370/338; 370/465
(58) Field of Classification Search ................ 370/338, 370/465
See application file for complete search history.

(56) References Cited

U.S. PATENT DOCUMENTS

| | | | | |
|---|---|---|---|---|
| 6,154,643 A * | 11/2000 | Cox | ............ | 455/406 |
| 6,466,544 B1 * | 10/2002 | Sen et al. | ............ | 370/231 |
| 6,600,903 B1 * | 7/2003 | Lilja et al. | ............ | 455/67.11 |
| 7,123,628 B1 * | 10/2006 | Hwang et al. | ............ | 370/469 |
| 7,369,621 B2 * | 5/2008 | Yoshii et al. | ............ | 375/261 |
| 7,386,314 B2 * | 6/2008 | Kim | ............ | 455/445 |
| 2001/0038620 A1 * | 11/2001 | Stanwood et al. | ............ | 370/336 |
| 2001/0043613 A1 * | 11/2001 | Wibowo et al. | ............ | 370/468 |
| 2004/0097254 A1 | 5/2004 | Laroia et al. | | |
| 2005/0003843 A1 * | 1/2005 | Ho et al. | ............ | 455/509 |

FOREIGN PATENT DOCUMENTS

| | | |
|---|---|---|
| EP | 0 690 650 A | 1/1996 |
| WO | WO-02-058300 | 7/2002 |
| WO | WO 2004/102908 A | 11/2004 |

OTHER PUBLICATIONS

"WCDMA for UMTS Radio Access for Third Generation Mobile Communications", by Harri Holma, Antti Toskala, et al, Wiley pp. 187-188, 223-230, Jul. 2000.
"Safety Channel Handover Procedure" *IEEE 802.16 Broadband Wireless Access Working Group;* Jun. 24, 2004; XP002351909.
"Providing Seamless Handoff in Wireless ATM Networks"*Computer Communications and Networks,* Oct. 12, 1998, pp. 737-741; XP010587073.
"Air Interface for Fixed Broadband Wireless Access Systems" *IEEE Standard for Local and metropolitan area networks;* Oct. 1, 2004; XP007900168.

* cited by examiner

*Primary Examiner*—Andrew Lee
(74) *Attorney, Agent, or Firm*—Blakely, Sokoloff, Taylor & Zafman LLP

(57) ABSTRACT

A system connected to a mobile station through a network and allocating a radio source to the mobile station for packet data service, the system including a base station connected to the mobile station through a wireless network, and having a physical layer connected to the mobile station through a wireless network and performing wireless access and a medium access control (MAC) layer performing service-specific resource allocation for the mobile station; and a control station having an upper layer connected to the base station through a wired network and receiving a result of service-specific resource allocation from the MAC layer, and performing as an interface between networks.

15 Claims, 7 Drawing Sheets

RADIO RESOURCE ALLOCATION SYSTEM FOR PACKET DATA SERVICE AND ALLOCATION METHOD THEREOF

CROSS REFERENCE TO RELATED APPLICATION

This application claims priority to and the benefit of Korea Patent Application No. 10-2004-0108243 filed on Dec. 17, 2004 in the Korean Intellectual Property Office, the entire content of which is incorporated herein by reference.

FIELD OF THE INVENTION

The present invention relates to a radio resource allocation system and an allocation method thereof, and more particularly to radio resource allocation and an allocation method for packet data services.

BACKGROUND OF THE INVENTION

When a mobile station requests a circuit-based call, a base station requests permission of resource allocation for the call from a control station. In other words, the control station manages radio resources for setting calls, and thus the permission by the control station is a prerequisite for controlling the calls (i.e., setting-up and release) for the mobile station that accesses the base station. With the permission of setting up the call, the mobile station occupies a given circuit until the call is disconnected.

FIG. 1 illustrates a structure of a conventional circuit-based mobile communication system.

As shown therein, the system includes a mobile station (MS) 30, a base station (BS) 10 providing the MS 30 with wireless access, and a control station (CS) 20 controlling the BS 10 through a wired network connection.

The CS 20 performs radio resource allocation while considering inter-cell interference in different BSs, interfacing between networks, and collecting statistical data of radio resources.

In detail, the CS 20 receives a resource request from the MS 30, and manages the radio resources related to setting-up/releasing the calls and use of additional radio resources. In addition, the CS 20 collects statistical data of the radio resources to distinctively distribute the radio resource for each cell in consideration of the interference between the cells.

The CS 20 includes a medium access control (MAC) layer 21 and an upper layer 22.

The BS 10 that receives a request for primary radio resource allocation from the MS 30 and transmits the request to the CS 20, and includes a physical layer 11 and a physical layer controller 12.

FIG. 2 illustrates a method for allocating a radio resource in the conventional circuit-based mobile communication system.

As shown therein, a request for radio source allocation is transmitted to the physical layer controller 12 of the BS 12 from the MS 30 in Step S10 and transmitted to the MAC layer 21 of the CS 20 by the physical layer controller 12 in Step S11. The upper layer 22 receives the request from the MAC layer 21 in Step S13, permits the request while considering the inter-cell interference in different BSs in Step S14, and then allocates the corresponding radio source to the MS 30 through the physical layer controller 12.

However, an existing method for allocating a radio channel is inappropriate for packet transmission since the packet does not have a given occupancy time, and multiple users share a single circuit in the packet-type radio data communication service. In particular, it is difficult to apply the existing radio channel allocation method considering the inter-cell interference to the packet-based radio data communication service because the interference within the cell varies depending on the time and the amount of packets in the packet-based communication service.

Thus, the packet-based radio communication service requires another radio resource allocation method that is different from the existing method since the packet-based radio communication service is designed to provide massive data to multiple users that access a single circuit.

A MAC layer of the BS manages user information to provide a satisfactory service to a user, and thus the IEEE 802.16 manages a user identifier by using a service flow identifier (SFID), a connection identifier (CID), and a medium access control identifier (MAC ID). In other words, the MAC layer perceives a user with reference to a corresponding relationship between the MAC ID, SFID, and CID. In such a conventional method, however, identification of a user is complicated and a change in the status of service is not considered. Thus more simplified methods for managing the user ID and controlling the user according to the service-specific status are required.

The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

SUMMARY OF THE INVENTION

The present invention has been made in an effort to provide a radio source allocation system for a packet data service and a method thereof having an advantage of solving problems of the conventional method.

An exemplary radio source allocation system for the packet data service according to an embodiment of the present invention includes a system connected to a mobile station through a network and allocating a radio source to the mobile station for packet data service. The system includes a base station and a control station. The base station is connected to the mobile station through a wireless network and includes a physical layer for radio access to the mobile station and a medium access control (MAC) layer for allocating a service-specific resource to the mobile station when receiving a service-specific resource allocation request from the mobile station. The control station includes an upper layer connected to the base station through a wired network and receiving a result of service-specific resource allocation from the MAC layer, and interfaces with networks.

When the MAC layer receives a service-specific resource request from the mobile station, the MAC layer may allocate a resource for the corresponding service when there is a resource left for the requested service.

When the mobile station is located on a cell boundary, the MAC layer may allocate a service-specific resource to the mobile station by using a predefined allocatable resource.

The MAC layer may manage a user based on a change in the service status of the user.

The MAC layer may identify a service for a user by using a medium access identifier (MAC ID) assigned during an authentication process of the mobile station and a status identifier mapped to the MAC ID.

The status identifier may include a sleep identifier (ID) for the mobile station in the sleeping status, and a waiting ID for the mobile station in the waiting status.

In a further embodiment of the present invention, there is provided a method for allocating radio sources for a packet data service in a radio resource allocation system that includes a base station having a medium access control (MAC) layer for allocating a radio source to a mobile station and a control station connected to the base station. In the method, a) the MAC layer receives a service-specific resource request from the mobile station, b) the MAC layer allocates a service-specific radio source to the mobile station in response to the request, and c) the MAC layer reports a result of the service-specific resource allocation performed in b) to the control station.

In b), the residual resource may be allocated to the corresponding service when there is a residual resource for the requested service.

b) may include determining whether a resource is left for the requested service, determining whether the mobile station is located on a cell boundary when the resource is left for the request service; and allocating a resource from among pre-defined allocatable resources when the mobile station is located on the cell boundary, and allocating a resource from among allocatable resources when the mobile station is not located on the cell boundary.

DETAILED DESCRIPTION OF THE EMBODIMENTS

In the following detailed description, only certain exemplary embodiment of the present invention has been shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive.

A MAC layer is set to manage a mobile station and allocate radio sources, and thus utilizes user information that sensitively changes depending on the radio channel condition according to an exemplary embodiment of the present invention. Thus, the MAC layer is included in the BS rather than included in the CS, and is located close to a physical layer.

Figure 1:
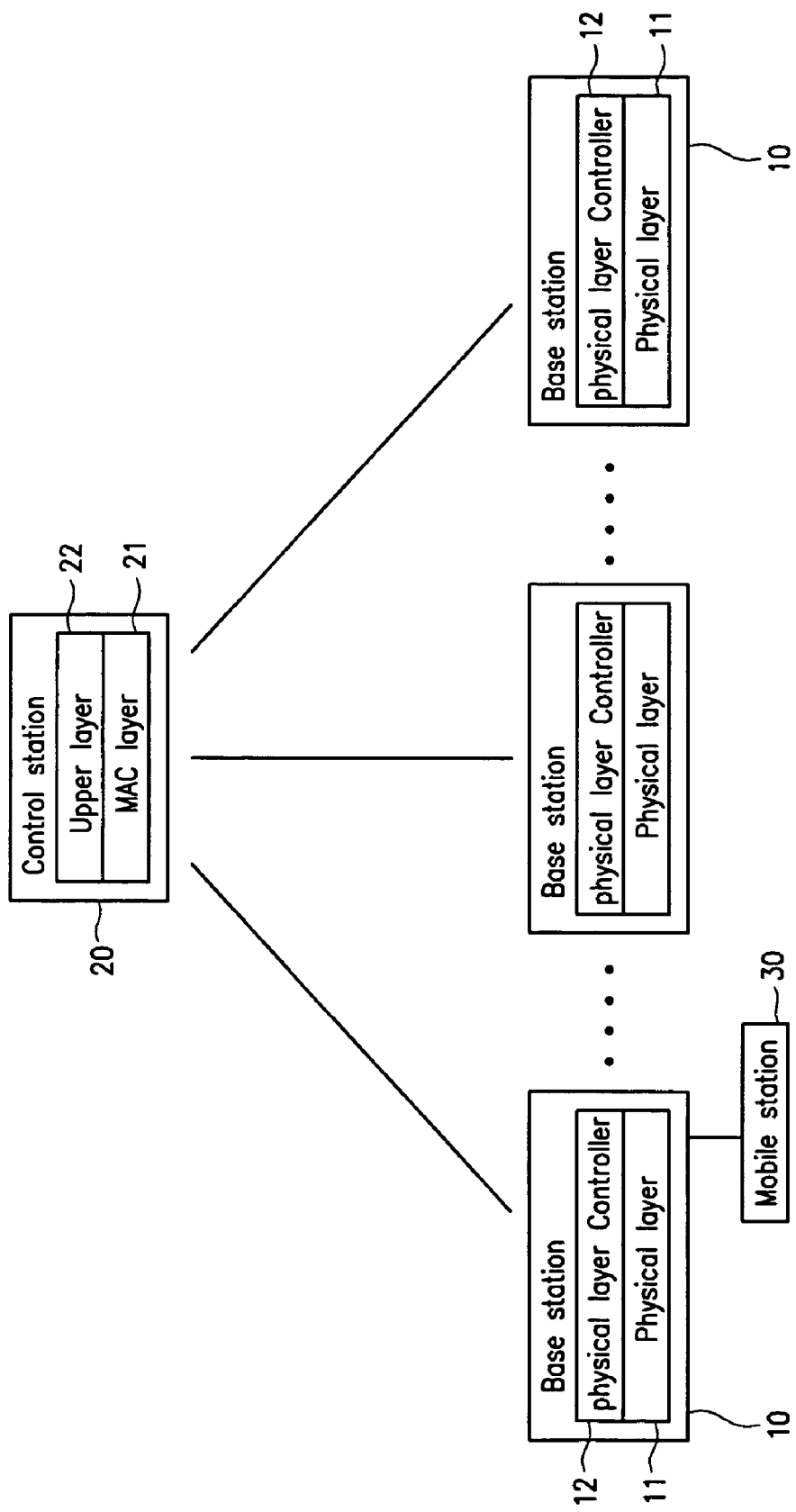
FIG. 1 illustrates a structure of a circuit-based conventional mobile communication system.
Figure 2:
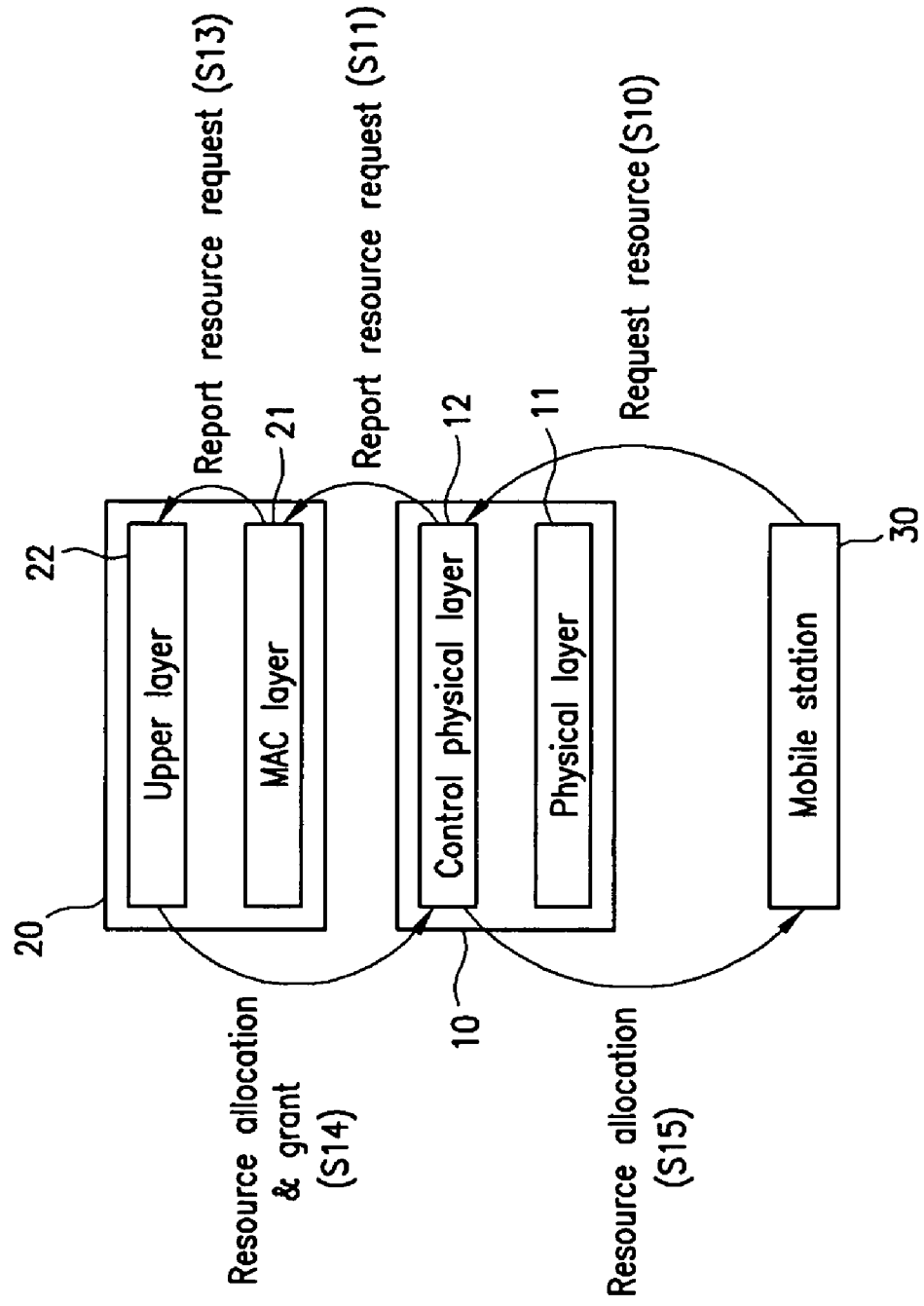
FIG. 2 illustrates a method for allocating radio resources in the circuit-based conventional mobile communication system.
Figure 3:
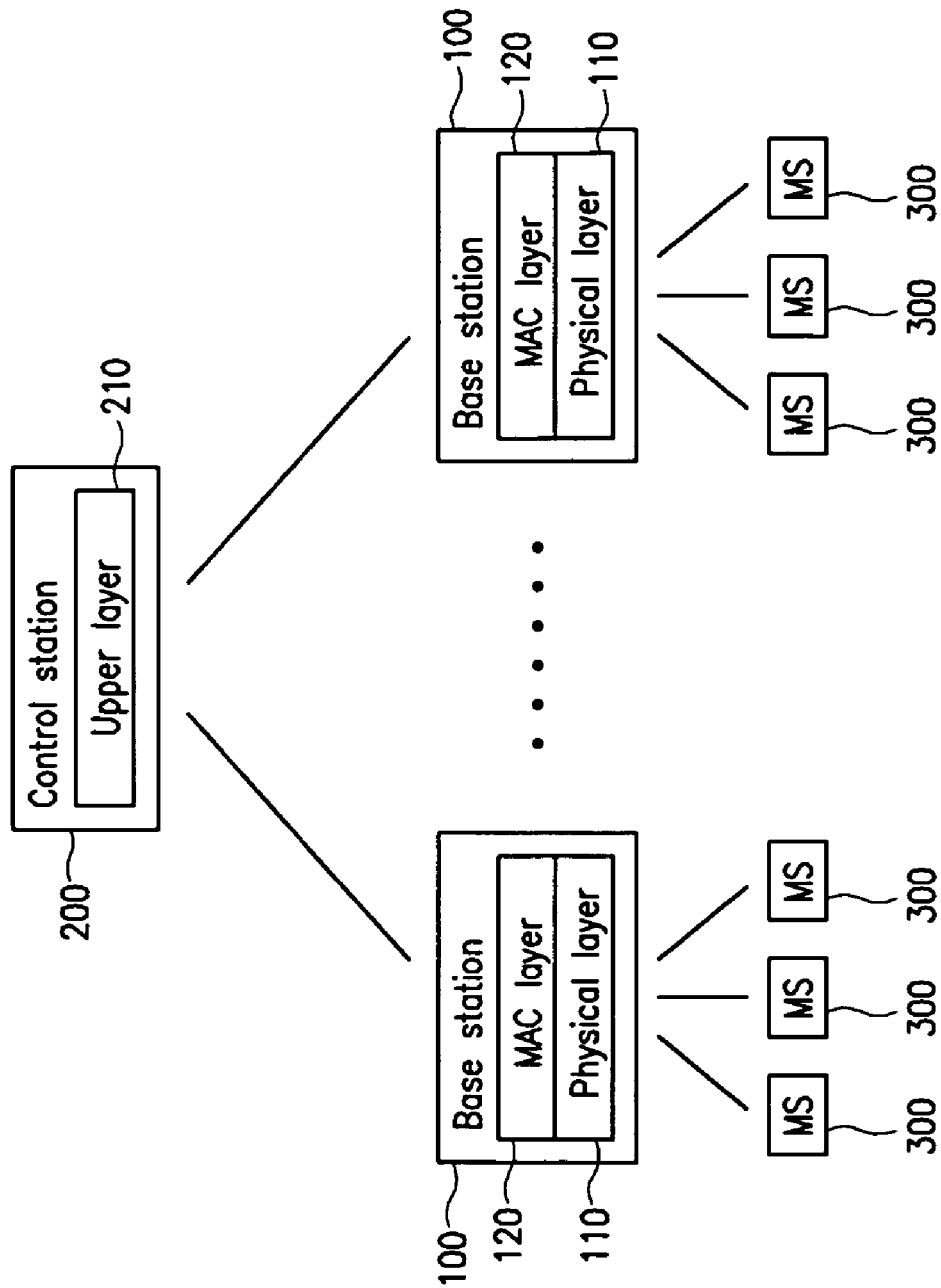
FIG. 3 illustrates a structure of a packet-based mobile communication system according to an exemplary embodiment of the present invention.

FIG. 3 illustrates a structure of a packet-based mobile communication system according to an exemplary embodiment of the present invention.

As shown therein, the system includes a base station (BS) 100 accessed by a mobile station (MT) 300, and a control station (CS) 200 controlling the BS 100 through a wired network connection.

The CS 200 interfacing with a network includes an upper layer 210.

The BS 100 includes a physical layer 110 for radio access with the MT 300, and a medium access control (MAC) layer 120 for allocating the corresponding resource when resource allocation is requested.

In other words, the structure of the packet-based mobile communication system is bisectional such that the MAC layer 120 mainly manages users using packet data and radio sources, and the CS 200 mainly performs network-related functions.

Figure 4:
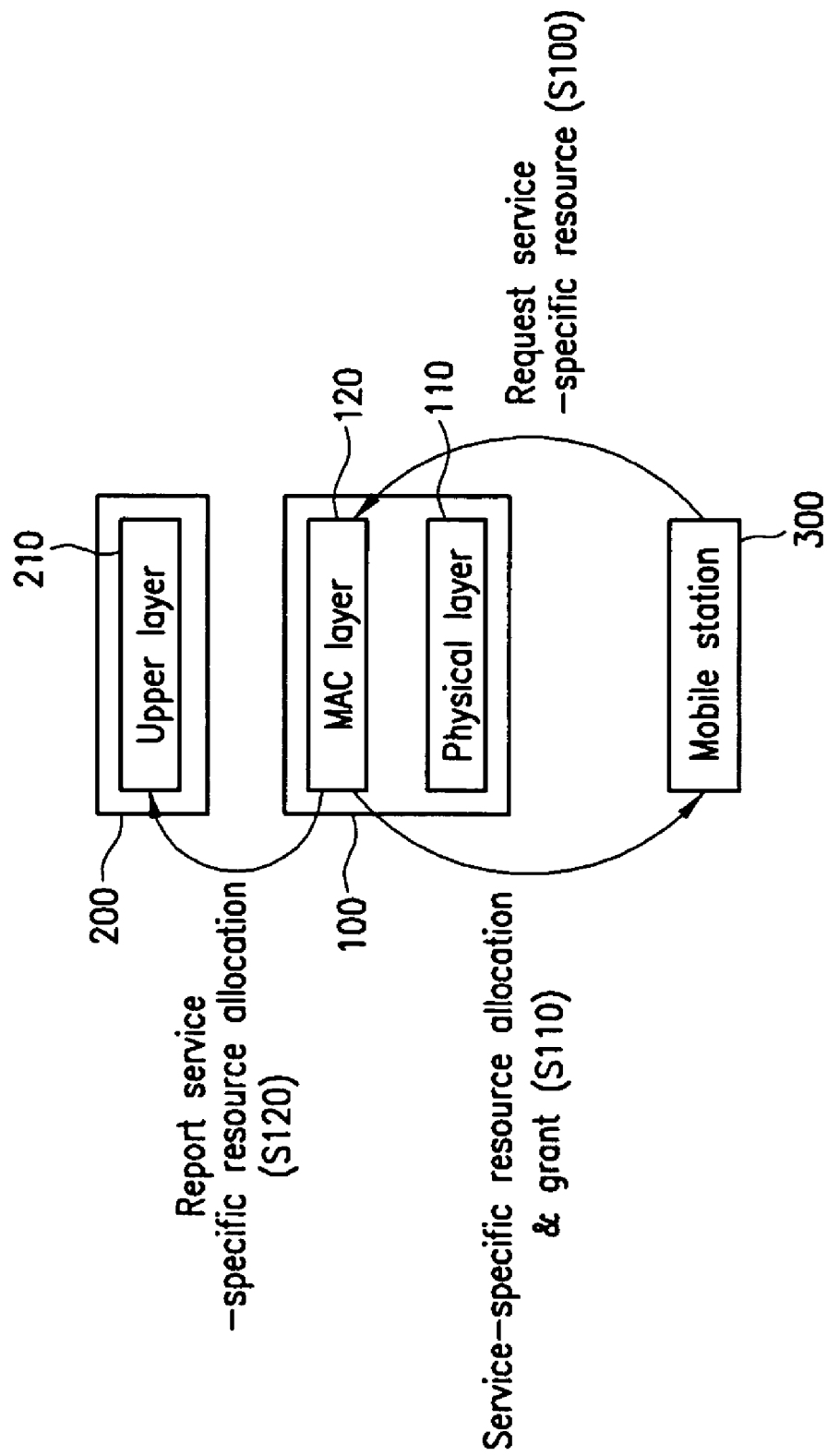
FIG. 4 illustrates a method for allocation of radio resources in the packet-based mobile communication system according to an exemplary embodiment of the present invention.

FIG. 4 illustrates a method for allocating a radio source in the packet-based mobile communication system according to an exemplary embodiment of the present invention.

Referring to FIG. 4, the MAC layer 120 of the BS 100 receives a service-specific resource request from the MS 300 in Step S100. The MAC layer 120 allocates a service-specific resource to the MT 300 in response to the request in Step S120, and reports a result of the service-specific resource allocation to the upper layer 210 of the CS 200 in Step S120. In other words, the upper layer 210 receives the result of the resource allocation from the MAC layer 120 rather than directly allocating the resource or setting-up/releasing the MT 300.

The MAC layer 120 of the BS 100 grants a user service when there is a resource presently left for the requested service. For example, the MAC layer 120 cannot grant the resource allocation request for the user requesting resource allocation for a video service when there is a resource left for a packet voice service.

When resource allocation is requested as described above, the resource allocation is granted in consideration of interference of a user to a cell in a conventional circuit-based system, but a user service request is granted when there is a residual resource according to an exemplary embodiment of the present invention because it is difficult to calculate general interference of each user service that requires a different amount of traffic depending on the radio channel condition in the packet-based system. However, each cell is informed of allocatable resources within each cell boundary during initialization of each base station to thereby avoid inter-cell interference. The inter-cell interference may be reduced by using pre-defined allocatable resources since the radio channel condition becomes poor on the cell boundary. Further, a process for using the pre-defined allocatable resources according to the embodiment of the present invention is similar to a process for distributing resources to each user in consideration of the inter-cell interference.

Figure 5:
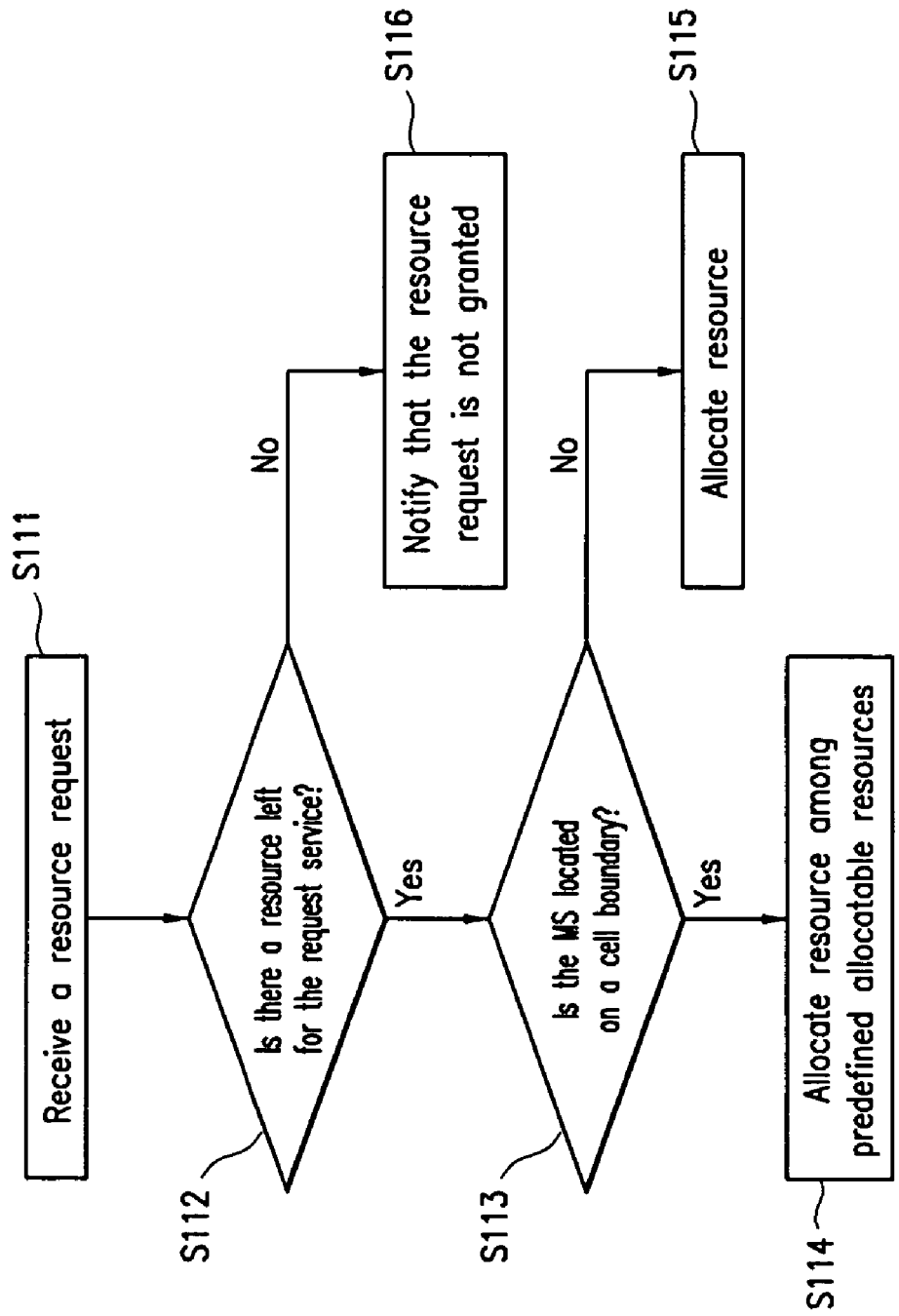
FIG. 5 illustrates a flow of the method of FIG. 4 in more detail.

FIG. 5 illustrates a flowchart of a resource allocation method performed by the MAC layer 120 according to an exemplary embodiment of the present invention in more detail.

The MAC layer 120 of the BS 100 receives a resource allocation request for a service from the MT 300 in Step S11, and checks whether there is a resource left for the service in Step S112. When there is a residual resource for the service, the MAC layer 120 checks whether the MT 300 is located on the cell boundary in Step S113.

When the MT 300 is located on the cell boundary, the MAC layer 120 allocates a resource from among predefined allocatable resources in Step S114, but the MAC layer 120 allocates a resource from among allocatable resources in Step S115 when the MT 300 is not located on the cell boundary.

When there is no residual resource for the requested service, the MAC layer 120 reports a message to the MT 300 to inform that the resource allocation of the requested service is not granted in Step S116.

Figure 6:
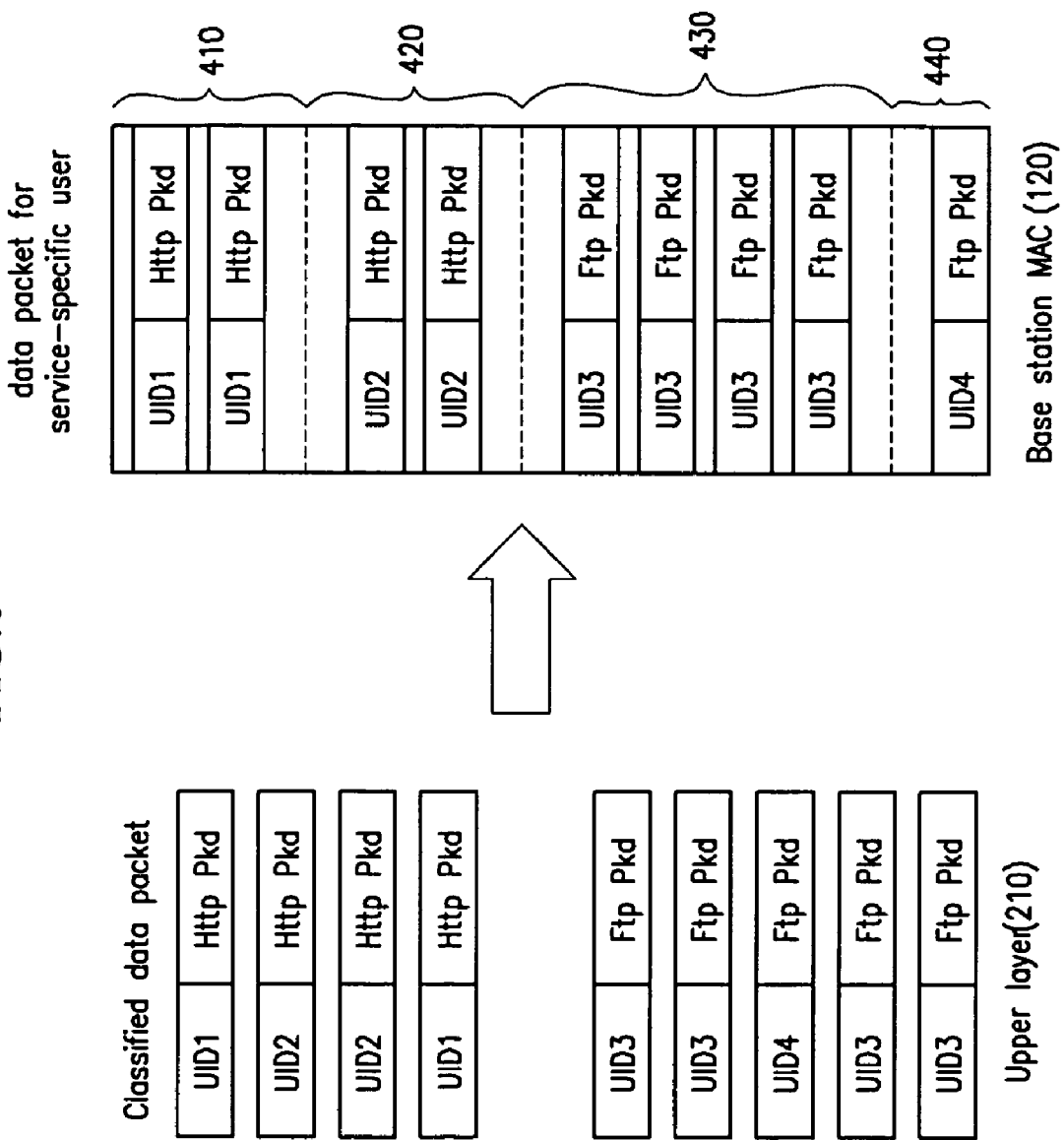
FIG. 6 illustrates a relationship between a packet classifier of an upper layer and a memory of a MAC layer.

FIG. 6 illustrates a relationship between a packet classifier of the upper layer 210 and a memory of the MAC layer 120.

The CS 200 classifies data packets, and transmits the classified packets to the MAC layer 120. The MAC layer 120 identifies the packets according to user-specific priorities.

As shown in FIG. 6, the MAC layer 120 reclassifies the data packets transmitted from the upper layer 210 into a data packet 410 for a user UID1, a data packet 420 for a user UID 2, a data packet 430 for a user UID 3, and a data packet for a user UID 4 and stores the re-classified data packets in the memory.

Herein, the MAC layer 120 identifies types of user-specific services according to quality of service (QoS), and prioritizes the user-specific services considering an optimized radio channel allocation time, an occupancy time in service-specific queues, an arrival time of packets, and packet occupancy in the service-specific queues for each user rather than indiscriminately prioritizing the services according to the QoS.

An identifier according to an exemplary embodiment of the present invention will be described.

Status of a user may be variously defined (i.e., waiting, busy, or idle), and a packet-based transmission user may use more than one service. Therefore, the status of the user is defined depending on services. In particular, when the user uses a voice packet service and an Internet service, the Internet service may be in the busy status but the voice packet may be in the waiting status for a while, and then an associated call may be disconnected.

Therefore, information on the status of a service-specific user becomes an important factor for determining a type of user management for packet transmission. The status may be defined for different purposes so as to be used for managing services of the users. For example, information on a user in the busy status is required for controlling packet retransmission, and information on a user in the waiting status is required for a scheduler to determine priority.

User management is performed based on changes in the status of the service-specific users according to an exemplary embodiment of the present invention. Thus, a change in a method for assigning an identifier may be required to manage the users according to the changes in the status of the users.

According to an exemplary embodiment of the present invention, a method for identifying service-specific users uses a medium access control identifier (MAC ID) assigned during an authentication process for a user's mobile station, and a status identifier mapped to the MAC ID. Service status of users is identified as sleep status and waiting status. The waiting status represents that the corresponding service of the user is waiting for transmission, and the sleep status can be applied to the following cases: when the mobile station is turned on without requesting resource allocation; when no resource allocation is continuously requested for a given period of time after receiving a service by using a previously allocated resource; when too many users request resource allocation and thus the corresponding service is disconnected; and when no resource is allocated from the earlier stage. Finite sleep IDs assigned to user services in the sleep status are different from each other, and each service user changes its status and periodically reports radio channel information by using an associated sleep ID.

Figure 7:
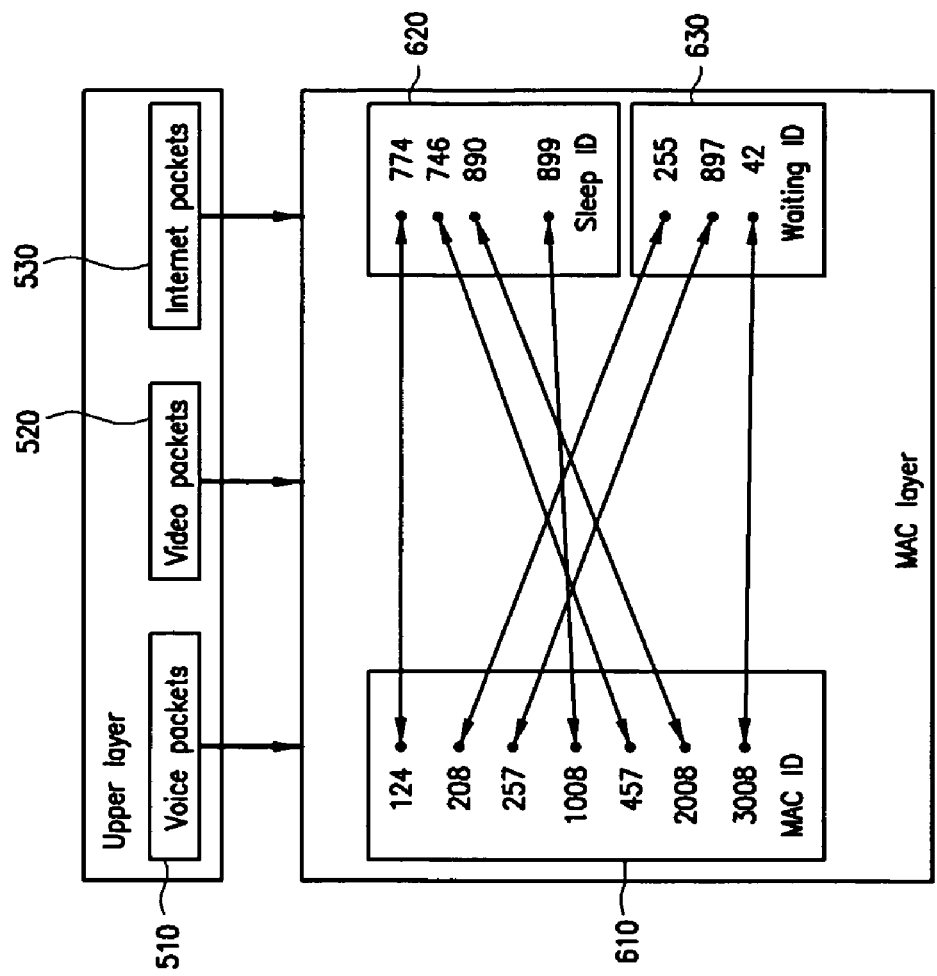
FIG. 7 illustrates an identifier mapping relationship according to an exemplary embodiment of the present invention.

FIG. 7 illustrates a mapping relationship of the identifier according to an exemplary embodiment of the present invention.

As shown therein, the MAC layer 120 receives voice packets 510, video packets 520, and Internet packets 530 from the upper layer 210.

The MAC layer 120 uses an identifier in a format of a MAC ID-Sleep ID to differentiate user services when transmitting/receiving control information on the a user service in the sleep status.

The user service requesting radio sources is considered to be in the waiting status and thus a finite waiting ID 630 is assigned to the user service.

The MAC layer 120 uses an identifier in a format of a MAC ID-Waiting ID to differentiate user services when transmitting/receiving control information on the user services in the waiting status.

In other words, each user service belongs to one status identifier, and the MAC layer 120 uses two combinations of the MAC ID (610) and the status identifiers (Sleep ID (620) and Waiting ID (630)) to receive/transmit the control information by applying a different status identifier to each user service.

The status identifier of the user service is variable and is forcibly changed to another status identifier according to the change in the status. For example, if a user of the Internet user service and the voice packet user service does not request a resource for the Internet service, the status of the user is forcibly changed to thereby extend a chance for another user service.

The MAC layer 120 transmits a status change message to the MT 300, and identifies the user service by using a combined identifier to avoid complexity due to the change of the variable status identifier. In addition, the MT 300 possesses a different status identifier for each user service and transmits/receives the control information by using a status identifier corresponding to the changes in the status of the user service.

As previously described, the upper layer 210 controls the MAC layer 120 to manage a radio source rather than directly allocates the radio sources or sets/releases the MT to reduce waste of time due to duplicate functions between layers to thereby efficiently control the system.

In addition, a method for user management is provided in consideration of service-specific status of each user rather than equally applying quality of service (QoS) to various types of services, thereby improving massive packet data transmission and increasing capacity.

Further, the MAC layer uses an identifier that is simple and unique, and is flexible to a change in the status, and thus management of identifiers for user services becomes easy to thereby offer chances of service for multiple users.

While this invention has been described in connection with what is presently considered to be practical exemplary embodiments, it is to be understood that the invention is not limited to the disclosed embodiment, but, on the contrary, is intended to cover various modifications and equivalent arrangements included within the spirit and scope of the appended claims.

What is claimed is:

1. A system connected to a mobile station through a network and allocating a radio source to the mobile station for packet data service, the system comprising:

a base station connected to the mobile station through a wireless network, and having a physical layer for radio access to the mobile station and a medium access control (MAC) layer for allocating a service-specific resource to the mobile station when receiving a service-specific resource allocation request from the mobile station, wherein the MAC layer identifies service for a user by using a medium access identifier (MAC ID) assigned during an authentication process of the mobile station and a status identifier mapped to the MAC ID; and a control station having an upper layer connected to the base station through a wired network and receiving a result of service-specific resource allocation from the MAC layer.

2. The system of claim 1, wherein when the MAC layer receives a service-specific resource request from the mobile station, the MAC layer allocates a resource for the corresponding service when there is a resource left for the requested service.

3. The system of claim 2, wherein when the mobile station is located on a cell boundary, the MAC layer allocates a service-specific resource to the mobile station by using a predefined allocatable resource.

4. The system of claim 1, wherein the MAC layer manages a user based on a change in a service status of the user.

5. The system of claim 1, wherein the status identifier includes a sleep identifier (ID) for the mobile station in the sleeping status, and a waiting ID for the mobile station in the waiting status.

6. The system of claim 2, wherein the MAC layer manages a user based on a change in the service status of the user.

7. The system of claim 6, wherein the MAC layer identifies service for a user by using a medium access identifier (MAC ID) assigned during an authentication process of the mobile station and a status identifier mapped to the MAC ID.

8. The system of claim 7, wherein the status identifier includes a sleep identifier (ID) for the mobile station in the sleeping status, and a waiting ID for the mobile station in the waiting status.

9. The system of claim 3, wherein the MAC layer manages a user based on a change in the service status of the user.

10. The system of claim 9, wherein the MAC layer identifies service for a user by using a medium access identifier (MAC ID) assigned during an authentication process of the mobile station and a status identifier mapped to the MAC ID.

11. The system of claim 10, wherein the status identifier includes a sleep identifier (ID) for the mobile station in the sleeping status, and a waiting ID for the mobile station in the waiting status.

12. A method for allocating radio sources for a packet data service in a radio resource allocation system comprising a base station having a medium access control (MAC) layer for allocating a radio source to a mobile station, and a control station connected to the base station, the method comprising:

a) the MAC layer receiving a service-specific resource request from the mobile station;

b) the MAC layer allocating a service-specific radio source to the mobile station in response to the request;

c) the MAC layer reporting a result of the service-specific resource allocation performed in b) to the control station; and d) the MAC layer identifying a service for a user by using a MAC ID assigned during an authentication process of the mobile station and a status identifier mapped to the MAC ID.

13. The method of claim 12, wherein in b), when there is a residual resource for the requested service, the residual resource is allocated to the corresponding service.

14. The method of claim 12, wherein b) comprises:

determining whether a resource is left for the requested service;

determining whether the mobile station is located on a cell boundary when the resource is left for the request service; and allocating a resource from among predefined allocatable resources when the mobile station is located on the cell boundary, and allocating a resource from among allocatable resources when the mobile station is not located on the cell boundary.

15. The method of claim 12, wherein the status identifier comprises a sleep identifier for the mobile station in the sleeping status and a waiting identifier for the mobile station in the waiting status.

* * * * *